June 2, 1936.  H. F. LEWIS  2,042,948
COMPACTING APPARATUS
Filed Feb. 6, 1935  3 Sheets-Sheet 2
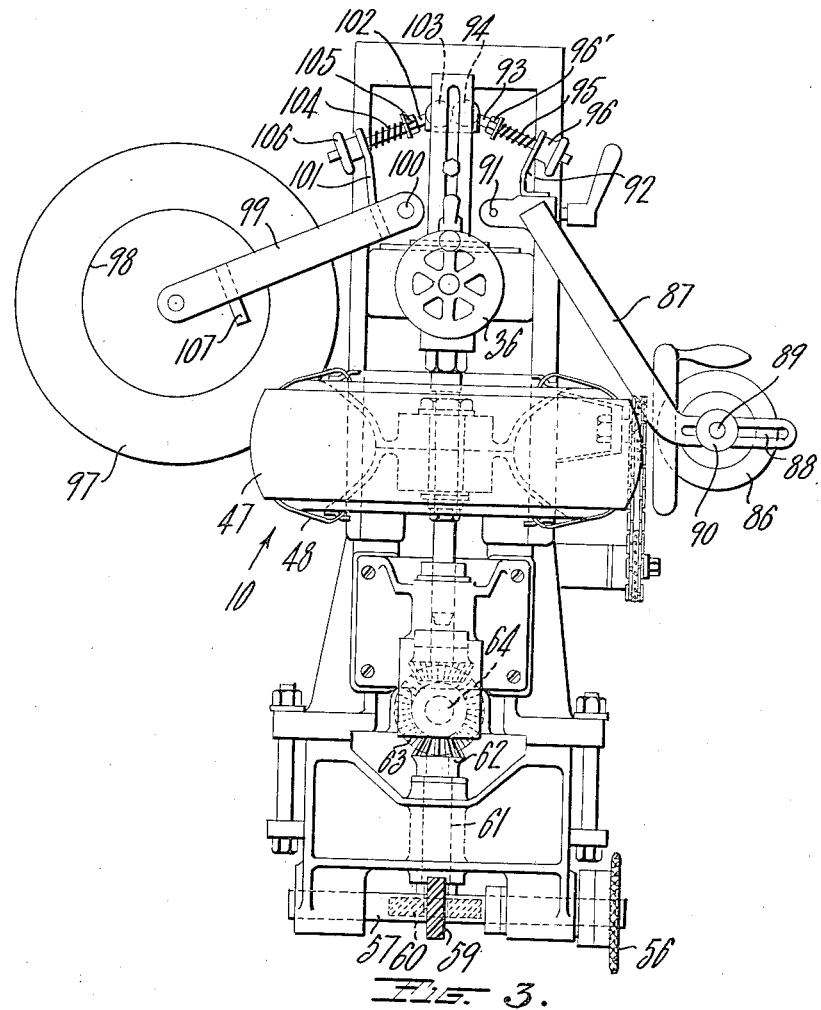
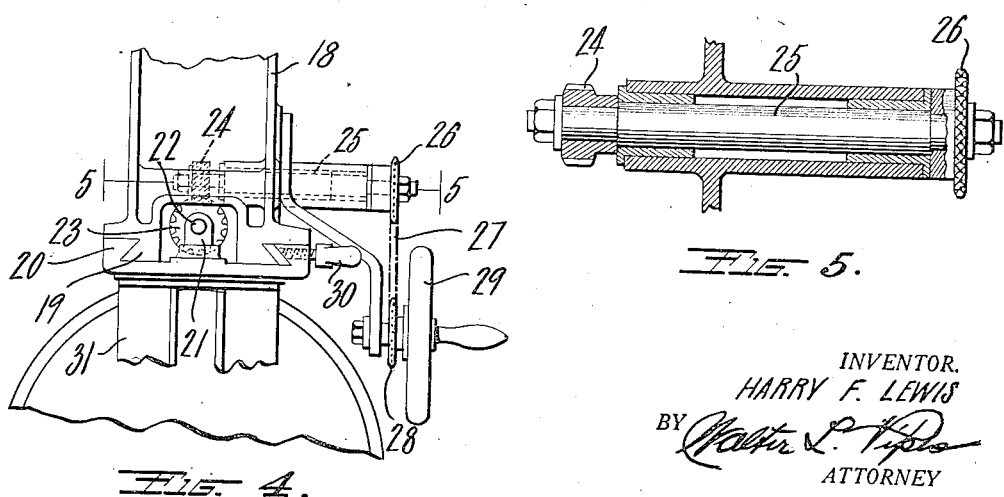
INVENTOR.
HARRY F. LEWIS
BY Walter L. Pyle
ATTORNEY June 2, 1936.                H. F. LEWIS                2,042,948
                         COMPACTING APPARATUS
                         Filed Feb. 6, 1935         3 Sheets-Sheet 3

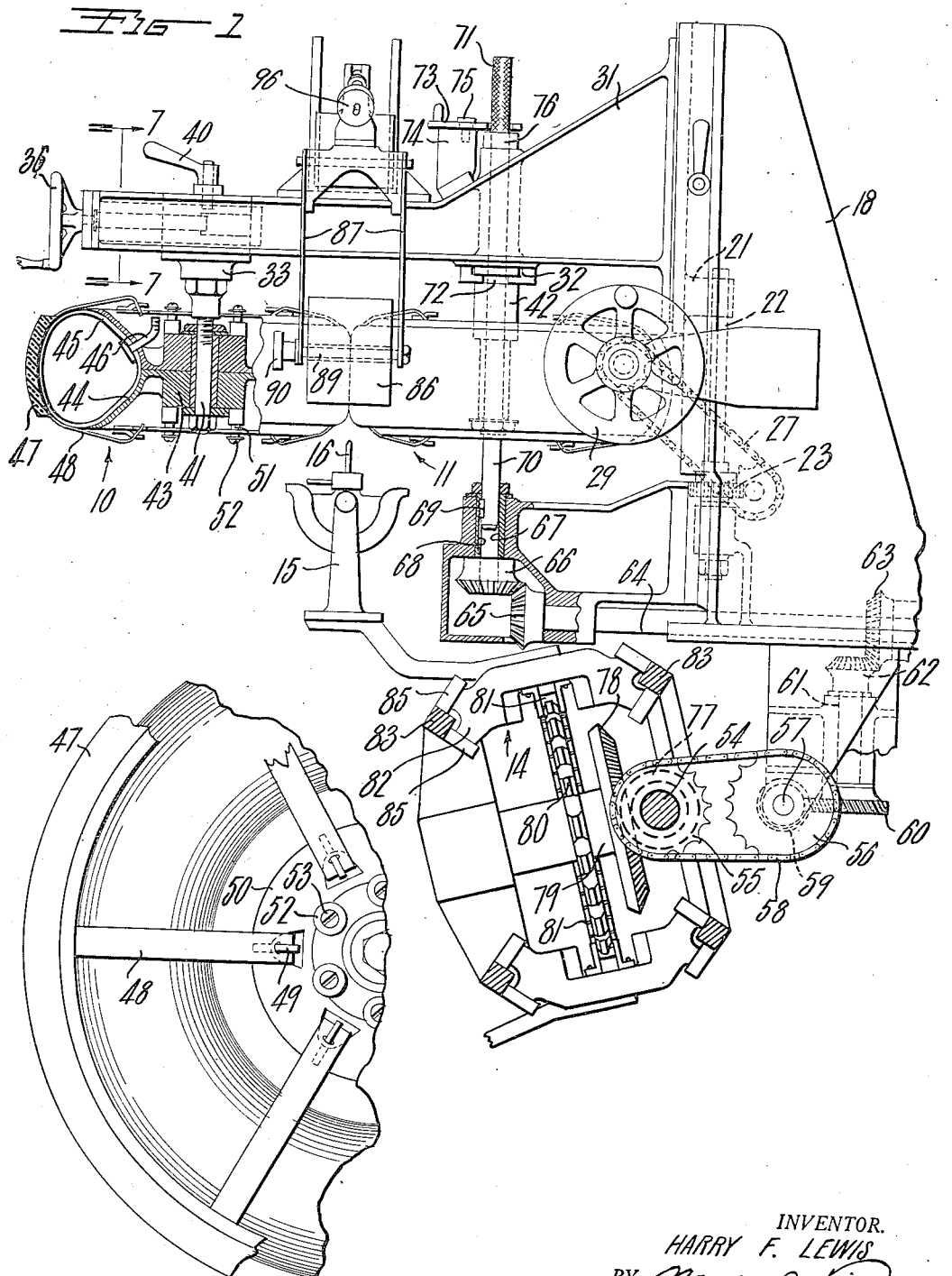

INVENTOR.
HARRY F. LEWIS
BY
ATTORNEY

Patented June 2, 1936

2,042,948

UNITED STATES PATENT OFFICE 2,042,948

COMPACTING APPARATUS

Harry F. Lewis, Hamden, Conn., assignor to United States Rubbber Company, New York, N. Y., a corporation of New Jersey Application February 6, 1935, Serial No. 5,171

12 Claims. (Cl. 18—2)

This invention relates to a compacting apparatus and more particularly to an apparatus for compacting laminated rubber or rubber and fabric parts, such as shoe foxings.

In the manufacture of rubber or rubber and fabric footwear, it is common in the building of an article to apply a strip of unvulcanized rubber around the bottom of the upper adjacent the sole, generally known as a foxing, the purpose of which is to waterproof the lower portion of the upper in the case of canvas upper footwear, and also to reinforce the lower portion of the upper and to secure a better joint between the rubber outsole and the upper.

For many years this foxing strip after application has been rolled down by means of a small hand roller, but due to the irregular outline of the lower portion of the shoe, considerable time, labor and skill are required to thoroughly compact and unite the foxing strip with the upper and with the outer edge of the sole portion. The small hand roller has practically only a line contact with the curved portions of the shoe and, if through carelessness or lack of skill, the foxing is not properly applied, air pockets are liable to be formed beneath the foxing which blister in vulcanization, or the foxing may not be thoroughly united to the upper, thus causing the finished shoe to be classed as a second or discarded entirely.

An object of the present invention is to provide an apparatus for automatically compacting and thoroughly uniting laminated rubber parts.

Another object is to provide an apparatus for uniting foxings and similar parts of rubber footwear.

Other objects will appear from the detailed description and drawings, in which latter—

Figure 1 is an elevation, partly in section and with parts omitted, of the front or inlet end of the machine;

Fig. 2 is a broken away enlarged detail of the machine;

Fig. 3 is an elevation of the machine taken from the left of Fig. 1;

Fig. 4 is a broken detail of a part of the mechanism as viewed from above;

Fig. 5 is a section on the line 5—5 of Fig. 4;

While the invention is capable of other uses, it will be shown and described in the present specification in an embodiment particularly adapted for the pressing of foxings on rubber or rubber and fabric footwear.

Until recent years the assembling of rubber footwear has been carried out substantially completely by individual operators, that is each operator built practically the entire footwear article. More recently, however, the assembly of footwear articles has been largely carried out on a moving conveyor, the lasts on which the articles are assembled being carried at spaced intervals on the conveyor past a series of operators located at fixed stations along the conveyor, with each operator assembling a given part or parts or carrying out some predetermined operation or operations. The present invention is shown in connection with such a footwear making conveyor.

Figure 6:
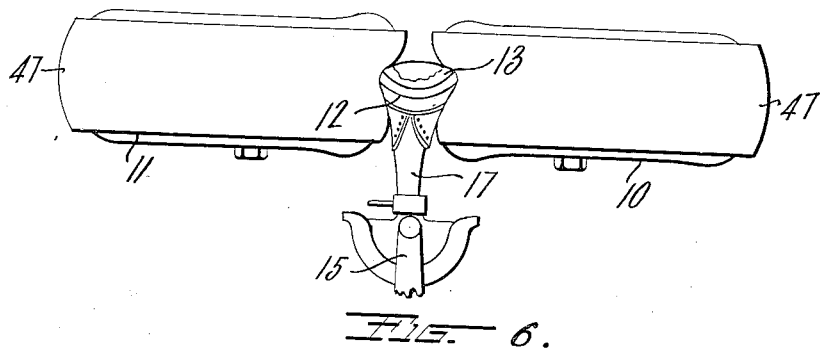
Fig. 6 is a view of the pressing mechanism with a pressed shoe emerging from the machine.

Referring to the drawings the apparatus comprises a pressing device such as two wheels 10 and 11 having yieldable outer peripheries between which an article such as a shoe having a foxing applied thereto is passed and pressed. The shoe 12 in Fig. 6 is shown as emerging from between the wheels. Before entering the wheels the shoe is lasted and the foxing 13 is applied thereto. The shoe 12 is carried between the wheels 10 and 11 by an endless conveyor 14 provided with a last support 15 having a pin 16 for engaging the socket in the last 17.

The foxing pressing mechanism is located above the conveyor at a point beyond the station at which the foxing is applied, and it consists of a frame or bracket 18 (Figs. 1 and 4), which bracket is provided with a dovetail slideway 19 upon which slides vertically the slide 20, carrying the foxing pressing apparatus. In order to adjust the slide 20 and hold it in adjusted position, the following mechanism is provided. Projecting from the slide 20 is a lug 21 through which is threaded a screw rod 22 carrying at its lower end a spiral gear 23 meshing with a spiral gear 24 on shaft 25, the opposite end of which shaft carries a sprocket 26 driven by a chain 27 from a sprocket 28 rotated by the hand wheel 29. By rotation of the hand wheel 29, the slide through the intermediate mechanism may be moved vertically up and down on the slideway 19 and it may be held in adjusted position by the hand screw 30.

Figure 7:
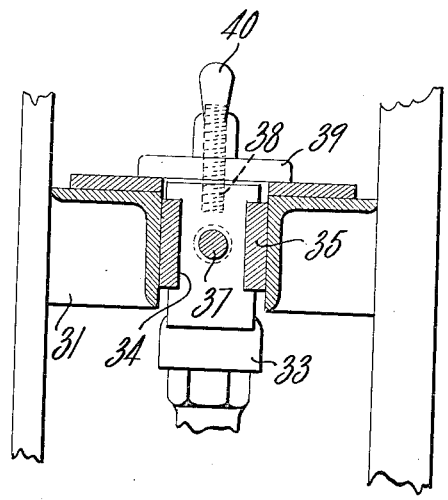
Fig. 7 is a sectional detail on the line 7—7 of Fig. 1.

Extending from the slide 20 is a frame 31 from which project a fixed bracket 32 and an adjustable bracket 33. Referring to Fig. 7 it will be seen that the bracket 33 is provided with grooves 34 on opposite sides of its upper end, which grooves engage over slideways 35, so that the bracket 33 may be moved toward or from the bracket 32. This movement is accomplished by means of a hand wheel 36 mounted to rotate in the end of the frame 31 and provided with a screw rod 37 threadedly engaging the upper end of the bracket 33. In order to lock the bracket 33 in adjusted position, it is provided with an upwardly extending threaded pin 38 which passes upwardly through a sliding clamp member 39, and by turning the hand nut 40 on the threaded pin 38, the bracket 33 may be locked in adjusted position by the sliding clamp member 39.

The pressing wheel 10 is rotatably mounted on a spindle 41 fixed to the movable bracket 33 and the wheel 11 is mounted on a sleeve 42 rotatably mounted in the bracket 32. Both pressing wheels 10 and 11 are alike, each having a hub 43 and a rim 44 extending therefrom as shown in cross section in Fig. 1. The rims 44 carry fluid containers in the form of pneumatic tubes 45 adapted to be inflated through valve stems 46 extending through the rims.

While it is possible to directly engage the foxings with the tubes 45, it has been found that due to their flexibility or elasticity there is a tendency for them to creep on the article which results in marring and uneven pressing of the foxing. To avoid this difficulty, a flexible contact member 47 is provided around the periphery of each tube 45. This contact member may be made of suitable flexible and resilient material and it has been found that sponge rubber serves the purpose very well. The contact members 47 are not fixedly secured on the tubes 45 but are mounted loosely enough to move around the same when in operation so that any creep will take place between the tube 45 and the contact member 47 and eliminate the creep between the foxing 13 and the contact member 47. This loose mounting is accomplished by providing the contact members with straps 48, the inner ends of which are drawn over hook members 49 mounted on loosely rotatable retaining members 50. In the present instance these retaining members are shown as rings which bear on their inner peripheries against small rollers 51 rotatably held by washers 52 and screws 53. The washers extend over the inner peripheries of the rings 50 as shown in Fig. 2 and prevent outward displacement of the rings, while the rollers 51 form substantially frictionless guides around which the rings 50 may rotate.

In order to prevent the foxing from being marred as a result of a difference in traveling speed of the contact member 47 and the foxing 13 the contact members 47 and the foxing are driven at the same speed. To accomplish that purpose the conveyor 14 and the pressing wheel 11 are driven from a common drive shaft 54 driven at a suitable speed by a motor (not shown) and through suitably selected train of gears having a gear ratio which will drive the shoe last 17 and the contact member 47 at the same speed. As shown in Fig. 1 the pressing wheel 11 is driven by a sprocket 55 on the drive shaft 54 which drives the sprocket 56 on the shaft 57 by means of a chain 58. Also keyed to said shaft 57 is a spiral gear 59 which meshes with and drives the companion gear 60 on a vertical shaft 61. A bevel gear 62 on the upper end of the shaft 61 drives a like gear 63 on the horizontal shaft 64. Another bevel gear 65 on the other extremity of said shaft 64 drives the bevel gear 66 which is keyed to the drive sleeve 67. The sleeve 67 is provided with an elongated keyway 68 which engages the key 69 on the drive shaft 70 which, in turn, is suitably keyed to the sleeve 42 on which the wheel 11 is secured. The upper extremity of the drive shaft 70 is knurled to form a handle 71 to withdraw the shaft and thus allow the wheel 11 to be taken out for repair or replacement. The end of the sleeve 42 is grooved at 72 to engage L shape members of the bracket 32 and thus prevent the wheel 11 from dropping down.

The shaft 70 is prevented from lifting out of engagement with the sleeve 42 by a latch 73 mounted on the bracket 74 by the pivot screw 75. When the shaft is in position the latch is moved so that the slot in the end straddles the shaft 70 and the collar 76 being of larger diameter than said slot prevents upward movement of the shaft 70.

The conveyor 14 is driven from the drive shaft 54 by a mechanism disclosed in U. S. Patent 1,953,256, granted April 3, 1934 comprising a bevel gear 77 keyed to the shaft 54 and meshing with a bevel gear 78 keyed to an inclined shaft 79 having a sprocket gear 80 keyed thereto. A sprocket chain 81 meshes with the sprocket gear 80 and is pivotally connected to the links 82 of the conveyor 14 which are driven thereby along the stationary track rails 83. The conveyor links 82 carry the jack supports 15 and are provided with wheels 85 which support them on the tracks 83.

The shoe lasts are provided with holes in their upper ends in which the pins 16 of the last supports 15 engage, the fit of the pins in the holes being somewhat loose to permit easy engagement and removal, and due to this and to wear there is some play of the lasted footwear article on the last support 15. As a result of this play, when the toe of the lasted article engages between the contact members 47, there is a tendency to depress the toe of the last. To obviate this objection, a roller 86 is disposed in advance of the foxing pressing mechanism at a distance such that the roller 86 will pass over and engage the heel of the lasted footwear article at about the moment the toe enters between the contact members 47. This roller is mouned between the forked arms 87, the lower ends of which are slotted as shown at 88 in Fig. 3. The shaft 89 on which the roller rotates passes through these slots and it may be secured in adjusted position by the thumb nut 90. By loosening the nut 90 the shaft 89 and roller 86 may be moved forwardly and backwardly in the slots 88 to properly dispose the roller for different lengths of footwear. In order that the roller may be resiliently pressed against the heel of the shoe, the upper ends of the arms 87 are pivotally mounted on the machine at 91 and an arm 92 extending from the upper end of the arms 87 has a rod 93 loosely passing through its upper end, the rod 93 being pivotally mounted at 94. Surrounding the rod 93 is a spring 95 which is held under compression between the nut 96' and the arm 92 by means of the adjusting nut 96. By varying the pressure on the spring 95 the pressure of the roller 86 on the heel of the lasted footwear article may be properly adjusted.

The lower portion of the foxing is extended inwardly on the sole portion of the shoe and in order to press this and other sole portions, another pneumatically supported pressing surface on a tube 97 is provided which is mounted on the periphery of a wheel 98, the latter being rotatably mounted in the forked arms 99 which are pivoted on the frame of the machine at 100. The pressing surface on the tube 97 may be similar in construction to that on wheels 10 and 11. Extending outwardly from the arms 99 is an arm 101 and through the outer end of this arm there extends loosely a rod 102 which is pivoted at 103. Surrounding this rod is a spring 104 which is held under compression between a nut 105 and the arm 101 by means of the thumb nut 106. It will be seen that the spring 104 compressing the arm 101 causes the pressing surface on the tube 97 to resiliently press against the sole portion of a lasted footwear article after the latter has passed through the devices for pressing the sides of the foxing. In order to prevent idle rotation of the tube 97, which might cause marring of a shoe subsequently engaging it, the arm or arms 99 may be provided with a spring steel piece 107 which may resiliently press against the hub of the wheel 98 and by its frictional action promptly bring the wheel to a halt after a footwear article has passed from beneath it.

In operation the footwear articles are assembled on the last support 15 and after the lasted article has passed the station where the foxing is assembled on it, it passes under the roller 86 which engages the heel of the lasted article at the moment the toe of the article engages the contact members 47, thus holding the shoe in proper position for the pressing of the foxing. As the lasted shoe passes between the contact members 47, the foxing is pressed into firm and uniform adhesion with the remaining shoe elements, and by reason of the softness and/or the ability of the contact members 47 to slip around the tube 45, the pressing is accomplished without any marring or distortion of the foxing. Marring of the foxing is also prevented due to the fact that the foxing and the contact members 47 are driven at the same speed.

By loosening the hand nut 40 and operating the hand wheel 36, the pressing members may be moved apart for adjustment or repair, and the pressure with which they engage the shoe may be also thus regulated. The pressure may also be regulated by varying the inflation of the tubes 45. By means of the locking nut 30 and the hand wheel 29, the entire pressing device may be moved toward and from the lasted footwear article on a line vertical to the axis of the shoe.

It is possible to send the shoes through the presser either toe first or heel first, but as above pointed out, it is preferred to send them through with the toe first. If a last support is used in which the last is somewhat loosely held in place, it is then desirable to utilize the roller 86 to prevent the toe of the lasted article from tilting downwardly when it engages the contact members 47. However, if a form of last support is used in which the last is rigidly gripped and has no play, the auxiliary roller 86 may be omitted.

While the specific embodiment of the invention herein described is particularly suited for the pressing of foxings on rubber footwear, it is obvious that the device is capable of more general application and it may be used for pressing other portions of a rubber footwear article or other laminated rubber parts.

This application is a continuation in part of application Serial No. 698,256, filed November 16, 1933.

Having thus described my invention what I claim and desire to protect by Letters Patent is:

1. An apparatus for compacting laminated footwear article parts comprising a pair of rotatable members each having a flexible fluid container extending around its periphery, a flexible article contacting member extending around each container and movably held thereon, and means for passing a lasted footwear article between said rotatable members.

2. An apparatus for compacting laminated footwear article parts comprising a pair of rotatable members each having a flexible fluid container extending around its periphery, a flexible article contacting member extending around said container and movably held thereon, and means for bodily moving one rotatable member relatively to the other.

3. A rubber footwear pressing apparatus comprising means for conveying a lasted footwear article, a pair of rotatable members located one on each side of the path of the article, a flexible fluid container disposed around the periphery of each member and adapted to be disposed in the path of one side of the footwear article, and a resiliently mounted roller in advance of said rotatable members and adapted to contact with the heel of the footwear article as its toe passes between said rotatable members.

4. A rubber footwear pressing apparatus comprising means for conveying a lasted footwear article, a pair of rotatable members located one on each side of the path of the article, a flexible fluid container disposed around the periphery of each member and adapted to be disposed in the path of one side of the footwear article, a rotatable member mounted in rear of said pair of rotatable members, and a flexible fluid container disposed around the periphery of said rotatable member and adapted to be disposed in the path of the sole portion of the footwear article.

5. A rubber footwear pressing apparatus comprising means for conveying a lasted footwear article, a pair of rotatable members located one on each side of the path of the article, a flexible fluid container disposed around the periphery of each member and adapted to be disposed in the path of one side of the footwear article, a rotatable member mounted in rear of said pair of rotatable members, a flexible fluid container disposed around the periphery of said rotatable member and adapted to be disposed in the path of the sole portion of the footwear article, and means for frictionally resisting idle rotation of said last named rotatable member.

6. A rubber footwear pressing apparatus comprising means for conveying a lasted footwear article, a pair of rotatable members located one on each side of the path of the article, a flexible fluid container disposed around the periphery of each member, a flexible article contacting member extending around each container, a pair of rotatable retainers loosely secured on opposite sides of each rotatable member, and connections between each pair of retainers and the corresponding flexible article contacting member.

7. A rubber footwear pressing apparatus comprising two members having opposed yieldable surfaces adapted to contact with the footwear, a conveyor adapted to carry the footwear between said surfaces, and means for driving said conveyor and said surfaces at the same speed and direction independently of the contact of the footwear with said yieldable surfaces.

8. An apparatus for compacting laminated footwear article parts comprising a pair of rotatable members each having a flexible fluid container extending around its periphery, a flexible article contacting member extending around each container and movably held thereon, means for passing a lasted footwear article between said rotatable members, and means for driving said last means and said contacting member at the same speed independently of the contact of the footwear article, with said contacting member.

9. A rubber footwear pressing apparatus comprising two members having opposed yieldable surfaces adapted to contact with the footwear, a conveyor adapted to carry the footwear between said surfaces, and means for driving said conveyor and said surfaces at the same speed and direction independently of the contact of the footwear with said yieldable surfaces, and a slipping driving connection between said driving means and said yieldable surfaces.

10. A rubber footwear pressing apparatus comprising two members having opposed yieldable surfaces adapted to contact with the footwear, a conveyor adapted to carry the footwear between said surfaces, and means for driving said conveyor and said surfaces at the same speed and direction independently of the contact of the footwear with said surfaces, a slipping driving connection between said driving means and said yieldable surfaces, and a roller mounted in advance of said surfaces adapted to contact with the heel of the footwear as its toe passes between said surfaces.

11. A rubber footwear pressing apparatus comprising two members having opposed yieldable surfaces adapted to contact with the footwear, a conveyor adapted to carry the footwear between said surfaces, and means for driving said conveyor and said surfaces at the same speed and direction independently of the contact of the footwear with said surfaces, a slipping driving connection between said driving means and said yieldable surfaces, a roller mounted in advance of said surfaces adapted to contact with the heel of the footwear as its toe passes between said surfaces and a roller mounted in rear of said surfaces adapted to compact the sole portion of the footwear.

12. An apparatus for compacting laminated footwear article parts comprising a pair of rotatable members each having a pneumatically supported article contacting surface, a member for supporting a lasted footwear article between said rotatable members, means for adjusting said rotatable members axially in respect to said supporting member and means for driving said supporting member substantially tangentially to the adjacent portions of said article contacting surfaces, and means for driving the adjacent portions of said contacting surfaces at the same speed and direction of the supporting member and independently of the contact of the footwear article with said contacting surfaces.

HARRY F. LEWIS.